(12) United States Patent
Brown et al.

(10) Patent No.: US 11,713,126 B2
(45) Date of Patent: Aug. 1, 2023

(54) AIRCRAFT AIR CONDITIONING PACK ASSEMBLY AND METHOD OF ASSEMBLING

(71) Applicant: The Boeing Company, Chicago, IL (US)

(72) Inventors: Myles Edward Brown, Bothell, WA (US); Jean-Michel I Fouard, Marysville, WA (US); Bryce Aaron Tillack, Mukilteo, WA (US); Sean Paul William Anderson, Bothell, WA (US)

(73) Assignee: The Boeing Company, Arlington, VA (US)

( * ) Notice: Subject to any disclaimer, the term of this patent is extended or adjusted under 35 U.S.C. 154(b) by 225 days.

(21) Appl. No.: 16/537,685

(22) Filed: Aug. 12, 2019

(65) Prior Publication Data
US 2021/0047045 A1 Feb. 18, 2021

(51) Int. Cl.
*B64D 13/06* (2006.01)
*B64D 13/08* (2006.01)

(52) U.S. Cl.
CPC .................................... *B64D 13/08* (2013.01)

(58) Field of Classification Search
CPC ............ B64D 2013/0603; B64D 13/08; B64D 13/06; B64D 2013/0618
USPC ........................................... 244/118.5, 129.4
See application file for complete search history.

(56) References Cited

U.S. PATENT DOCUMENTS

| | | | |
|---|---|---|---|
| 2,634,656 A | 4/1953 | Woollens et al. | |
| 2,998,948 A | 9/1961 | Sisk | |
| 4,306,693 A | 12/1981 | Cooper | |
| 4,419,926 A | 12/1983 | Cronin et al. | |
| 4,523,517 A | 6/1985 | Cronin | |
| 4,969,509 A * | 11/1990 | Merensky | B64D 13/08 165/41 |
| 5,114,103 A | 5/1992 | Coffinberry | |
| 5,125,597 A | 6/1992 | Coffinberry | |
| 5,137,230 A | 8/1992 | Coffinberry | |
| 5,141,182 A | 8/1992 | Coffinberry | |
| 5,143,329 A | 9/1992 | Coffinberry | |

(Continued)

FOREIGN PATENT DOCUMENTS

| | | |
|---|---|---|
| EP | 2998225 A1 | 3/2016 |
| EP | 3075658 A1 | 5/2016 |

(Continued)

OTHER PUBLICATIONS

Extended European Search Report regarding European Application No. 20184023.8 dated Dec. 15, 2020; pp. 1-7.

*Primary Examiner* — Frantz F Jules
*Assistant Examiner* — Jason N Thompson
(74) *Attorney, Agent, or Firm* — Armstrong Teasdale LLP

(57) ABSTRACT

An aircraft air conditioning pack assembly including an air conditioning pack configured to discharge heat, and an exterior panel positioned in close proximity to the air conditioning pack. The exterior panel includes an opening defined therein, a first side facing towards the air conditioning pack, and a second side defining an exterior surface configured to be in communication with a free stream airflow. At least a portion of the air conditioning pack is disposed within the opening to facilitate transferring heat from the air conditioning pack to the free stream airflow.

14 Claims, 11 Drawing Sheets

(56) References Cited

U.S. PATENT DOCUMENTS

| | | | |
|---|---|---|---|
| 5,337,579 A | 8/1994 | Saia et al. | |
| 5,423,498 A * | 6/1995 | Fluegel | F28F 1/22 244/117 A |
| 5,979,828 A * | 11/1999 | Gruensfelder | B64C 1/14 244/129.1 |
| 6,478,253 B1 | 11/2002 | Seidel | |
| 6,634,597 B2 | 10/2003 | Johnson et al. | |
| 6,681,592 B1 | 1/2004 | Lents et al. | |
| 6,928,832 B2 | 8/2005 | Lents et al. | |
| 7,188,488 B2 | 3/2007 | Army et al. | |
| 7,207,521 B2 | 4/2007 | Atkey et al. | |
| 7,210,653 B2 | 5/2007 | Atkey et al. | |
| 7,252,263 B1 | 8/2007 | Hagemeister et al. | |
| 7,305,842 B1 | 12/2007 | Schiff | |
| 7,325,772 B1 * | 2/2008 | Hanewinkel, III | B64D 13/00 244/129.4 |
| 8,132,758 B2 | 3/2012 | Army et al. | |
| 2007/0069078 A1 | 3/2007 | Hoffjann et al. | |
| 2007/0095521 A1 * | 5/2007 | Muhlthaler | F28D 15/0266 165/274 |
| 2008/0019842 A1 * | 1/2008 | Coates | F04D 25/16 417/2 |
| 2009/0146010 A1 | 6/2009 | Cohen | |
| 2009/0212047 A1 | 8/2009 | Harman et al. | |
| 2009/0230243 A1 * | 9/2009 | Army | B64D 13/06 244/118.5 |
| 2011/0186263 A1 * | 8/2011 | Piesker | B64D 13/00 165/47 |
| 2012/0325967 A1 * | 12/2012 | Motohashi | B64D 37/32 244/129.4 |
| 2013/0331019 A1 * | 12/2013 | Piesker | F28D 7/08 454/76 |
| 2013/0333857 A1 * | 12/2013 | Guering | B64D 13/00 165/41 |
| 2016/0159466 A1 * | 6/2016 | Daggett | B64C 23/06 244/130 |
| 2016/0288912 A1 | 10/2016 | Richardson et al. | |
| 2017/0253343 A1 * | 9/2017 | Hara | B64D 13/06 |
| 2020/0140094 A1 * | 5/2020 | White | B64D 13/08 |
| 2021/0031937 A1 * | 2/2021 | Schimmels | B64C 1/12 |

FOREIGN PATENT DOCUMENTS

| | | |
|---|---|---|
| WO | 2009064288 A1 | 5/2009 |
| WO | 2015183360 A2 | 12/2015 |

* cited by examiner

US 11,713,126 B2

AIRCRAFT AIR CONDITIONING PACK ASSEMBLY AND METHOD OF ASSEMBLING

FIELD

The field relates generally to aircraft environmental control systems and, more specifically, to an air conditioning pack and pack bay assembly with improved heat dissipation capabilities.

BACKGROUND

At least some known aircraft include a ram air system that provides ram air to at least one air conditioning pack of an aircraft environmental control system (ECS). In some known aircraft, the air conditioning pack is positioned within a pack bay of the aircraft along with other aircraft components. The air conditioning pack uses ram air to provide cooling to the high-temperature pneumatic air that is delivered to a passenger cabin of the aircraft. However, the ram air does not extract all of the internal heat load and, as a result, the heat may be transferred to the components within the pack bay and to the surrounding aircraft structure. At least some aircraft include a layer of insulation around the air conditioning packs to reduce the discharge of heat from the air conditioning packs to within the pack bay. However, such insulation increases the overall weight and spatial envelope of the aircraft, and may have a limited service life.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, an aircraft air conditioning pack assembly is provided. The assembly includes an air conditioning pack configured to discharge heat, and an exterior panel positioned in close proximity to the air conditioning pack. The exterior panel includes an opening defined therein, a first side facing towards the air conditioning pack, and a second side defining an exterior aircraft surface configured to be in communication with a free stream airflow. At least a portion of the air conditioning pack is disposed within the opening to facilitate transferring heat from the air conditioning pack to the free stream airflow.

In another aspect, an aircraft is provided. The aircraft includes a pack bay defined on an underside of the aircraft, with the pack bay including an interior. An air conditioning pack is positioned within the interior, and the air conditioning pack is configured to discharge heat. An exterior panel is positioned in close proximity to the air conditioning pack and at least partially defining the interior. The exterior panel includes an opening defined therein, a first side facing towards the air conditioning pack, and a second side defining an exterior surface of the aircraft configured to be in communication with a free stream airflow. At least a portion of the air conditioning pack is disposed within the opening to facilitate transferring heat from the air conditioning pack to the free stream airflow.

In yet another aspect, a method of assembling an aircraft is provided. The method includes defining a pack bay on an underside of the aircraft, wherein the pack bay includes an interior, positioning an air conditioning pack within the interior, wherein the air conditioning pack is configured to discharge heat, and positioning an exterior panel in close proximity to the air conditioning pack to at least partially define the interior. The exterior panel includes an opening defined therein, and the exterior panel is positioned such that a first side thereof faces towards the air conditioning pack, and such that a second side thereof defines an exterior surface of the aircraft configured to be in communication with a free stream airflow. The method also includes disposing at least a portion of the air conditioning pack within the opening to facilitate transferring heat from the air conditioning pack to the free stream airflow.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

The implementations described relate to an air conditioning pack and pack bay assembly with improved heat dissipation capabilities. As described herein, the assembly includes an air conditioning pack configured to discharge heat, and an exterior panel positioned in close proximity to the air conditioning pack. The exterior panel has an opening defined therein, which provides a flow communication path between the pack bay and an ambient environment. At least a portion of the air conditioning pack is disposed within the opening such that the air conditioning pack is exposed to the ambient environment. The portion of the air conditioning pack disposed within the opening has no intervening layer of thermally insulating material positioned between the air conditioning pack and the exterior panel. In one implementation, the air conditioning pack has a bottom wall that extends through the opening to be in direct flow communication with the ambient environment. The bottom wall may have an airfoil cross-sectional shape to facilitate preserving the aerodynamic efficiency of the aircraft. In either implementation, the heat generated by the air conditioning pack is dischargeable to the ambient environment in an efficient, space-saving, and weight-reducing manner that enhances heat rejection from the internal flow.

As used herein, an element or step recited in the singular and preceded with the word "a" or "an" should be understood as not excluding plural elements or steps, unless such exclusion is explicitly recited. Furthermore, references to "exemplary implementation" or "one implementation" of the present disclosure are not intended to be interpreted as excluding the existence of additional implementations that also incorporate the recited features.

Figure 1:
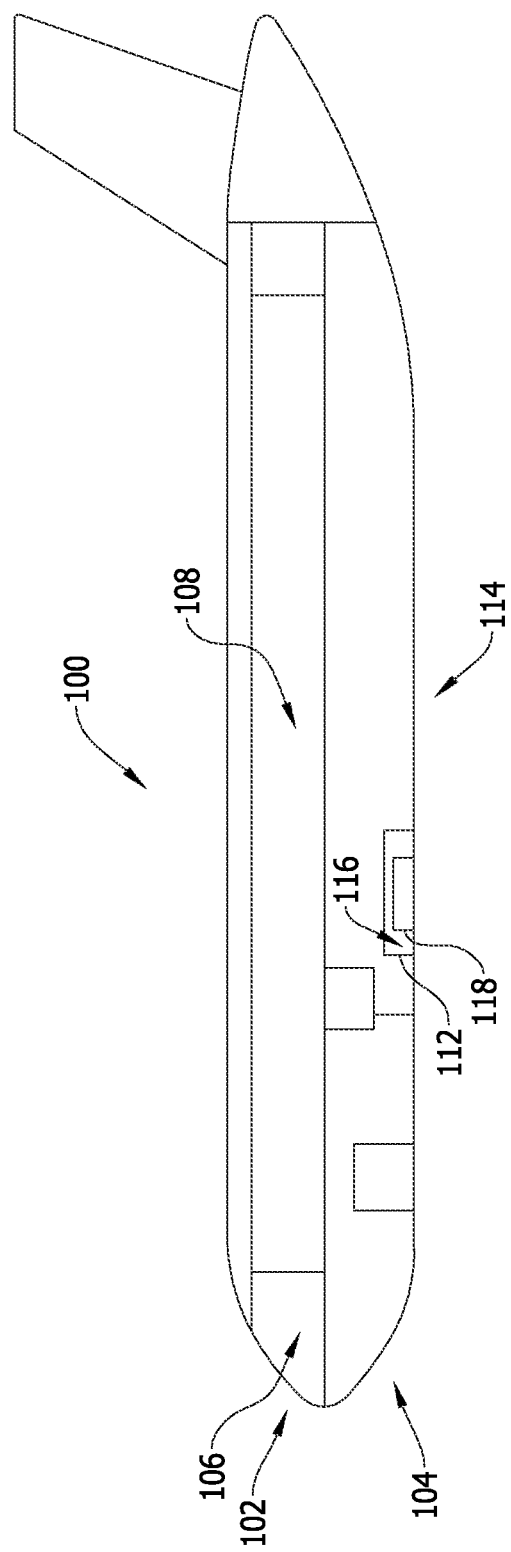
FIG. 1 is a schematic view of an example aircraft.

FIG. 1 is a schematic view of an example aircraft 100. Aircraft 100 includes pressurized areas 102 and unpressurized areas 104. Pressurized areas 102 include, but are not limited to, a cockpit 106, and a passenger cabin 108. Unpressurized areas 104 include, but are not limited to, a pack bay 112 defined on an underside 114 of aircraft 100. Pack bay 112 has an interior 116, and an air conditioning pack 118 is positioned within interior 116. In operation, air conditioning pack 118 receives airflow from the engines, an auxiliary power unit, or electrically driven compressors (all not shown) on aircraft 100, for example. Air conditioning pack 118 then cools the airflow, and discharges the cooled airflow for distribution within pressurized areas 102. Thus, air conditioning pack 118 generates and dissipates heat during operation thereof.

Figure 2:
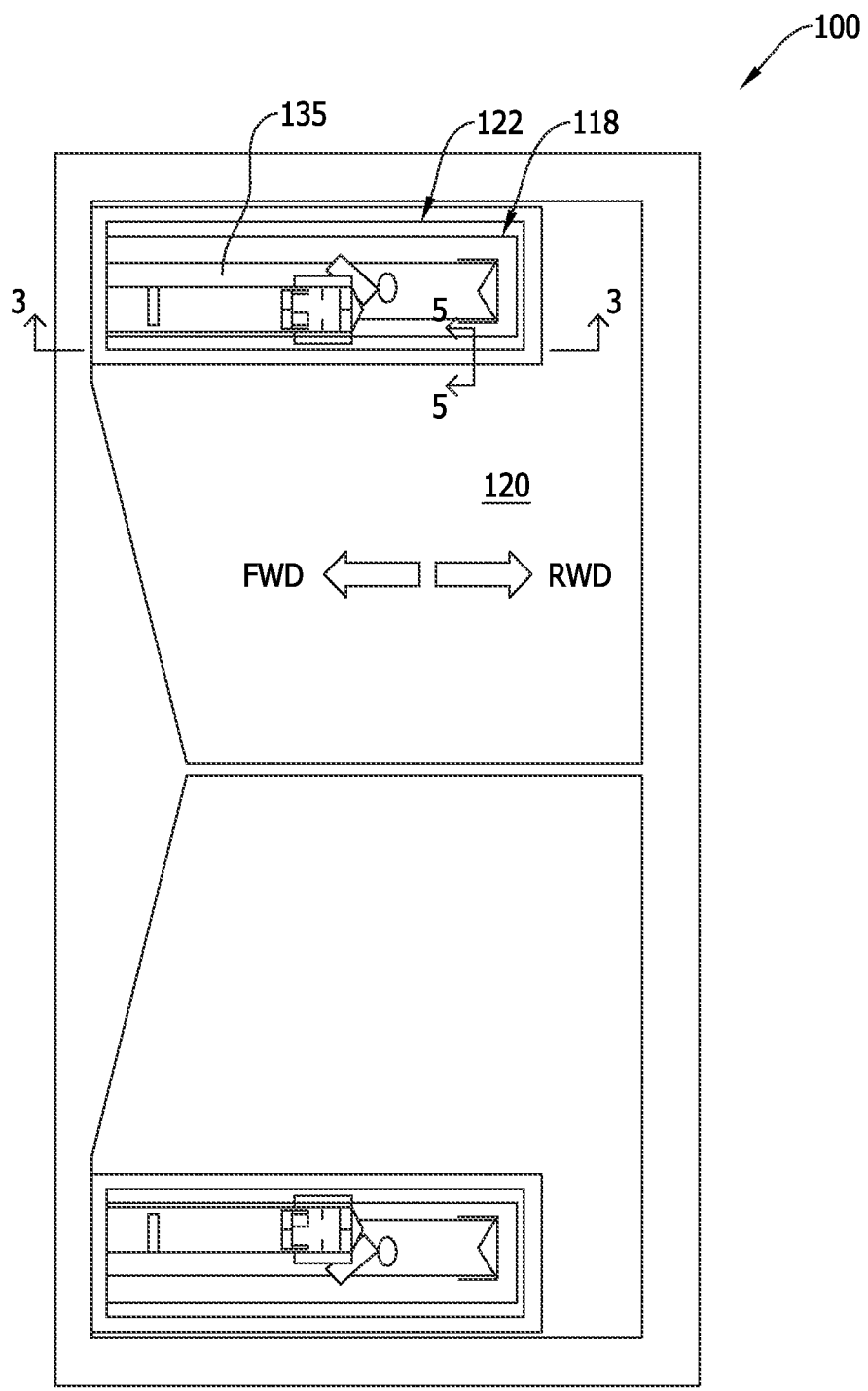
FIG. 2 is a bottom view of a portion of the aircraft shown in FIG. 1.
Figure 3A:
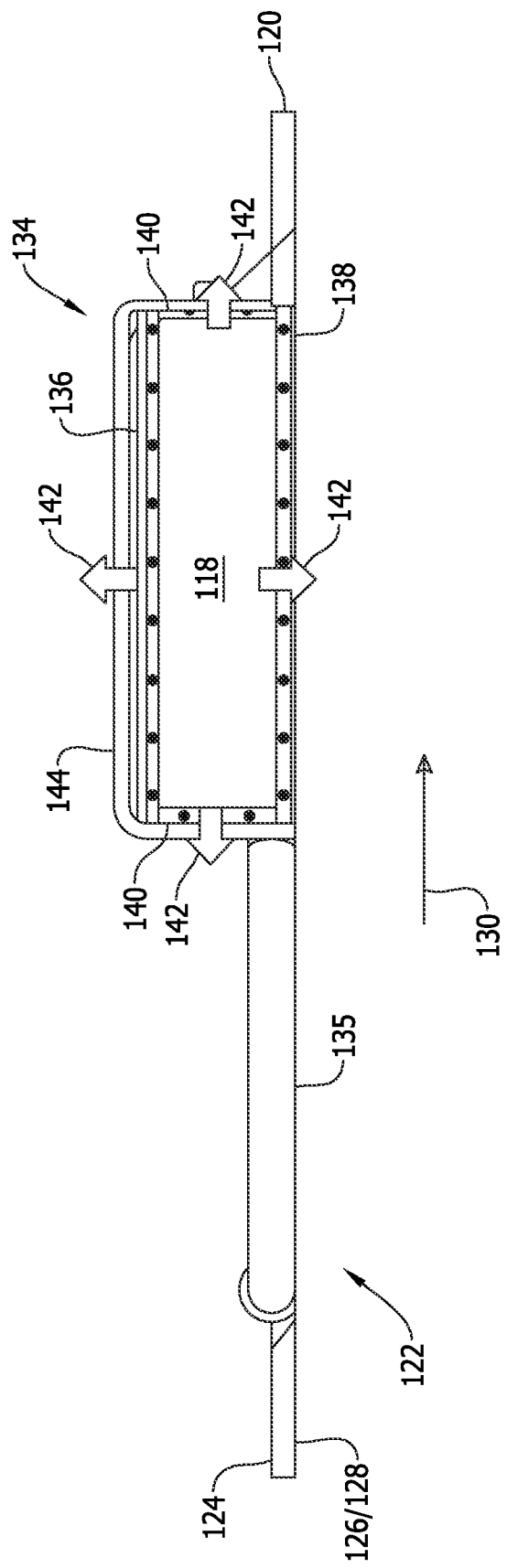
FIG. 3A is a sectional view of a portion of the aircraft shown in FIG. 2 and taken along line 3-3, the portion of the aircraft including an example aircraft air conditioning pack assembly.

FIG. 2 is a bottom view of a portion of aircraft 100, and FIG. 3A is a sectional view of a portion of aircraft 100 taken along line 3-3. Aircraft 100 includes an exterior panel 120 in close proximity to air conditioning pack 118 positioned within pack bay 112. Exterior panel 120 has an opening 122 defined therein. Exterior panel 120 also has a first side 124 that faces towards air conditioning pack 118, and a second side 126 that defines an exterior surface 128 of aircraft 100. First side 124 faces towards air conditioning pack 118 in that at least a portion of air conditioning pack 118 extends in the direction in which first side 124 faces. Exterior surface 128 is in communication with a free stream airflow 130 that is channeled past exterior panel 120. Free stream airflow 130 is defined by an ambient environment 132 defined exterior of aircraft 100. In addition, the velocity and cooling capacity of free stream airflow 130 is generally directly proportional to the velocity of aircraft 100, and free stream airflow 130 is channeled past exterior panel 120 in a substantially rearward direction (RWD) when aircraft 100 is in motion. As used herein, the term "close proximity" refers to when exterior panel 120 is either in contact with, or is minimally spaced apart from, any portion of air conditioning pack 118.

Air conditioning pack 118 includes a heat exchanger 134, and a plurality of ducts 135 are in flow communication with heat exchanger 134. Airflows are channeled to heat exchanger 134 via one or more ducts 135 to facilitate transferring heat between the airflows, and an airflow is discharged from heat exchanger 134 for distribution within pressurized areas 102 (shown in FIG. 1), for example. Heat exchanger 134 has a top side 136, a bottom side 138, and a plurality of lateral sides 140 extending therebetween. As noted above, air conditioning pack 118 generates heat during operation thereof. For example, as illustrated in FIG. 3A, heat 142 is discharged from each side 136, 138, and 140 of air conditioning pack 118.

Figure 3B:
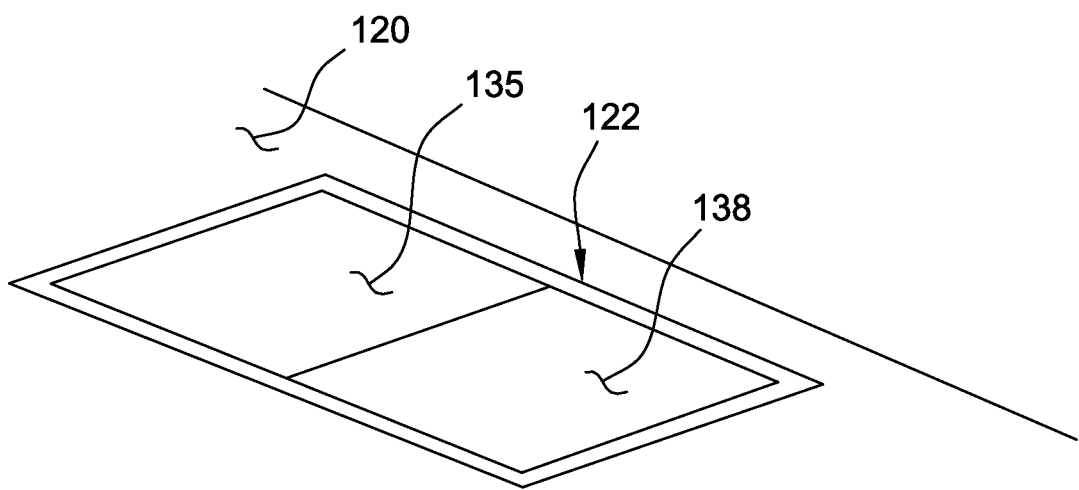
FIG. 3B is a perspective of an exterior panel, opening, and ducts.

Referring to FIGS. 3A and 3B, at least a portion of air conditioning pack 118 is disposed within opening 122 of exterior panel 120 to facilitate transferring heat 142 from air conditioning pack 118 to free stream airflow 130. For example, bottom side 138 of heat exchanger 134 and at least a portion of ducts 135 are disposed within opening 122, and are directly exposed to ambient environment 132. As such, air conditioning pack 118 and ducts 135 are positioned to discharge heat 142 directly to free stream airflow 130. In addition, bottom side 138 and the portion of ducts 135 are disposed to be substantially flush with exterior surface 128 of aircraft 100. As such, bottom side 138 and the portion of ducts 135 are exposed to ambient environment 132 while still substantially maintaining the aerodynamic efficiency of aircraft 100.

In one implementation, a layer 144 of thermally insulative material extends over at least a portion of heat exchanger 134. For example, as described above, bottom side 138 of heat exchanger 134 is directly exposed to ambient environment 132 to facilitate heat discharge to free stream airflow 130. However, the remaining sides of heat exchanger 134, such as top side 136 and lateral sides 140, are covered by layer 144 to facilitate reducing heat transfer between air conditioning pack 118 and interior 116 of pack bay 112. As such, components (not shown) within pack bay 112, electronic or otherwise, and the aircraft structure, are protected from exposure to increased heat and temperature variations. Examples of thermally insulative material include, but are not limited to, a fiberglass material, such as in blanket form, or a closed cell foam material such as polyvinylidene fluoride or polyvinylidene difluoride (PVDF).

Figure 4A:
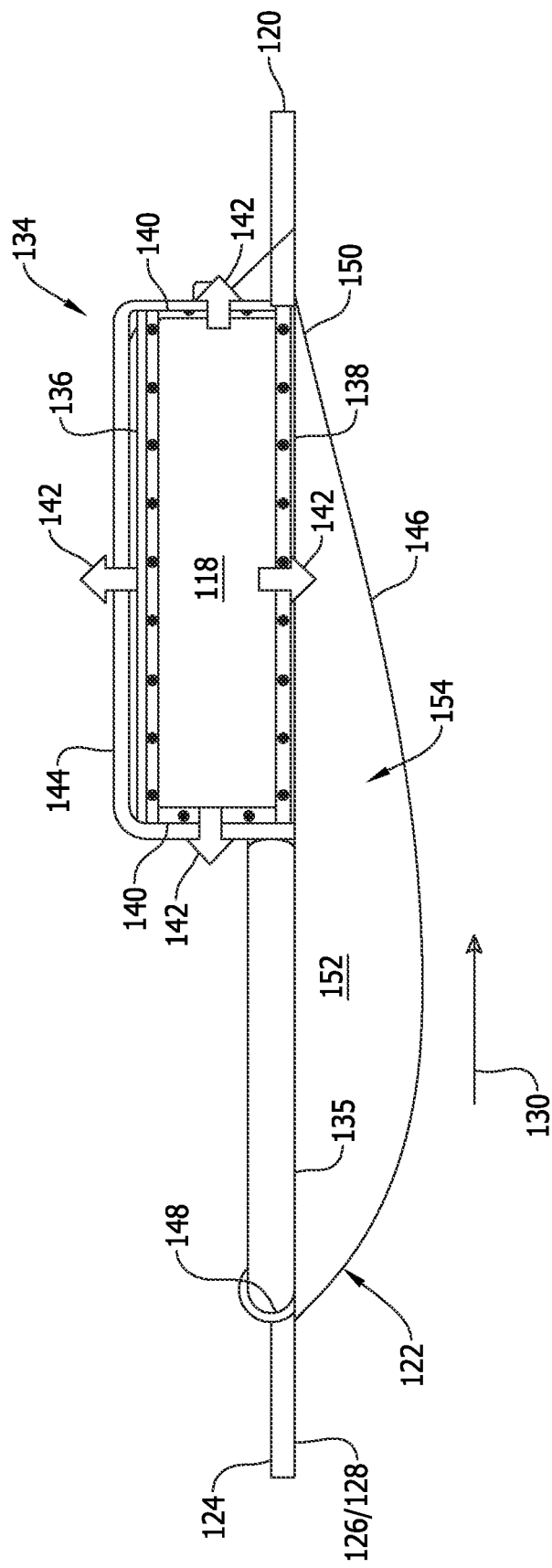
FIG. 4A illustrates the sectional view shown in FIG. 3A and including an additional aircraft air conditioning pack assembly.
Figure 4B:
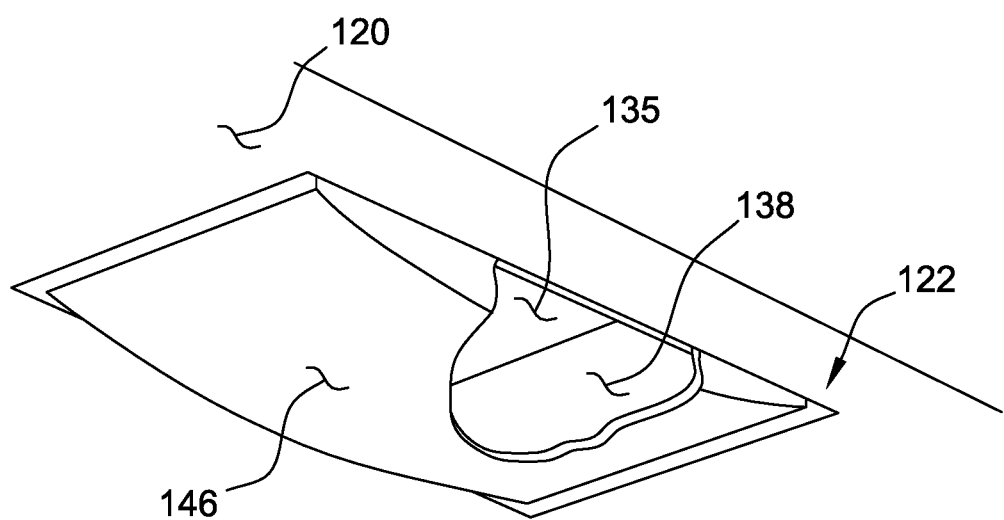
FIG. 4B is a perspective view of the pack assembly.

Referring now to FIGS. 4A and 4B, air conditioning pack 118 includes a bottom wall 146 disposed on bottom side 138 of heat exchanger 134. At least a portion of bottom wall 146 extends through opening 122 in exterior panel 120 for positioning exterior of pack bay 112. That is, in one implementation, bottom wall 146 is coupled to first side 124 of exterior panel 120 and the portion of bottom wall 146 extends from first side 124 through opening 122. Alternatively, bottom wall 146 is formed separately from heat exchanger 134 and coupled to second side 126 of exterior panel 120. In either implementation, bottom wall 146 is oriented to be in flow communication with free stream airflow 130 to facilitate defining a thermal communication pathway for heat 142 discharged from air conditioning pack 118. In addition, opening 122 is at least partially defined by a forward edge 148 and a rearward edge 150 of exterior panel 120. In either implementation, bottom wall 146 extends between forward edge 148 and rearward edge 150 to facilitate sealing interior 116 from ambient environment 132.

In addition, exposing bottom wall 146 to free stream airflow 130 facilitates reducing the aerodynamic efficiency of aircraft 100 (shown in FIG. 1). As such, the portion of bottom wall 146 extending through opening 122 has an airfoil cross-sectional shape to reduce the amount of drag induced to aircraft 100 by bottom wall 146 during flight. The shape of bottom wall 146 facilitates defining an open space 152 between heat exchanger 134 and bottom wall 146, and between ducts 135 and bottom wall 146. In one implementation, open space 152 contains air, which receives heat 142 from heat exchanger 134, and facilitates its passage through bottom wall 146, for transfer to free stream airflow 130.

Alternatively, thermally conductive material 154 is positioned between air conditioning pack 118 and bottom wall 146, and between ducts 135 and bottom wall 146. Thermally conductive material 154 facilitates enhancing heat transfer from air conditioning pack 118 and ducts 135 to free stream airflow 130. Example thermally conductive materials include, but are not limited to, a thermally conductive foam material, heat pipes, or a non-structural and lightweight metallic material such as aluminum.

Figure 5:
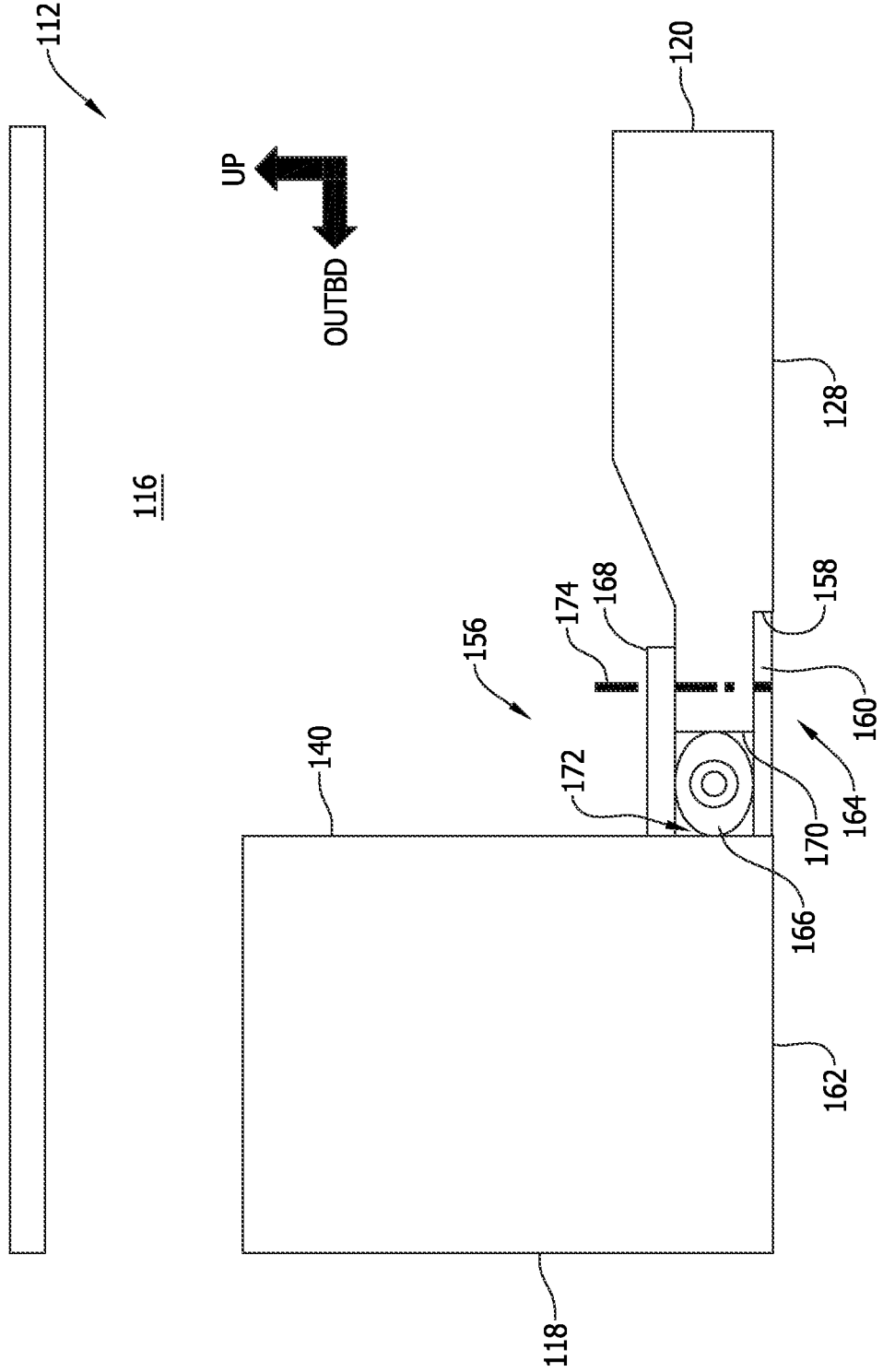
FIG. 5 is a schematic sectional view of a portion of the aircraft shown in FIG. 2 and taken along line 5-5, the portion of the aircraft including an example sealing system.

FIG. 5 is a schematic sectional view of a portion of the aircraft 100 including an example sealing system 156 in which exterior panel 120 provides a primary load path for the installation of air conditioning pack 118. Sealing system 156 is configured to restrict the inflow of free stream airflow 130 and debris (not shown) through opening 122. In the example implementation, exterior panel 120 includes an indent 158, and air conditioning pack 118 includes a flange 160 sized to be received within indent 158. For example, indent 158 and flange 160 are sized such that an exterior surface 162 of air conditioning pack 118 is substantially flush with exterior surface 128 of exterior panel 120 at an interface 164 defined therebetween.

Sealing system 156 includes at least one seal member positioned about the periphery of opening 122. For example, sealing system 156 includes a first seal member 166 and a second seal member 168 positioned between air conditioning pack 118 and exterior panel 120. Exterior panel 120 includes a side edge 170 that is spaced from lateral side 140 of air conditioning pack 118 such that a cavity 172 is defined therebetween. First seal member 166 is positioned within cavity 172, and is pre-loaded before being positioned within cavity 172 to facilitate sealing interior 116 of pack bay 112 from ambient environment 132. Second seal member 168 is coupled to air conditioning pack 118 and exterior panel 120 to facilitate sealing cavity 172. That is, second seal member 168 is coupled to lateral side 140 of air conditioning pack 118, and extends across cavity 172 to further couple to first side 124 of exterior panel 120. A fastener 174 extends through second seal member 168, exterior panel 120, and flange 160 of air conditioning pack 118 to facilitate installing air conditioning pack 118 on aircraft 100. As such, second seal member 168 statically affixed between air conditioning pack 118 and exterior panel 120 to facilitate enhancing the seal provided between interior 116 of pack bay 112 and ambient environment 132. In an alternative implementation, a second fastener is insertable, and is accessible for removal and installation, from the exterior side of aircraft 100. As such, pack bay 116 is accessible from exterior of aircraft 100 when air conditioning pack 118 is uncoupled from exterior panel 120.

First seal member 166 and second seal member 168 are fabricated from any material that enables aircraft 100 to function as described herein. An example seal material includes, but is not limited to, an elastomeric material. When fabricated from elastomeric material, first seal member 166 and second seal member 168 are capable of accommodating relative movement between air conditioning pack 118 and exterior panel 120.

Figure 6:
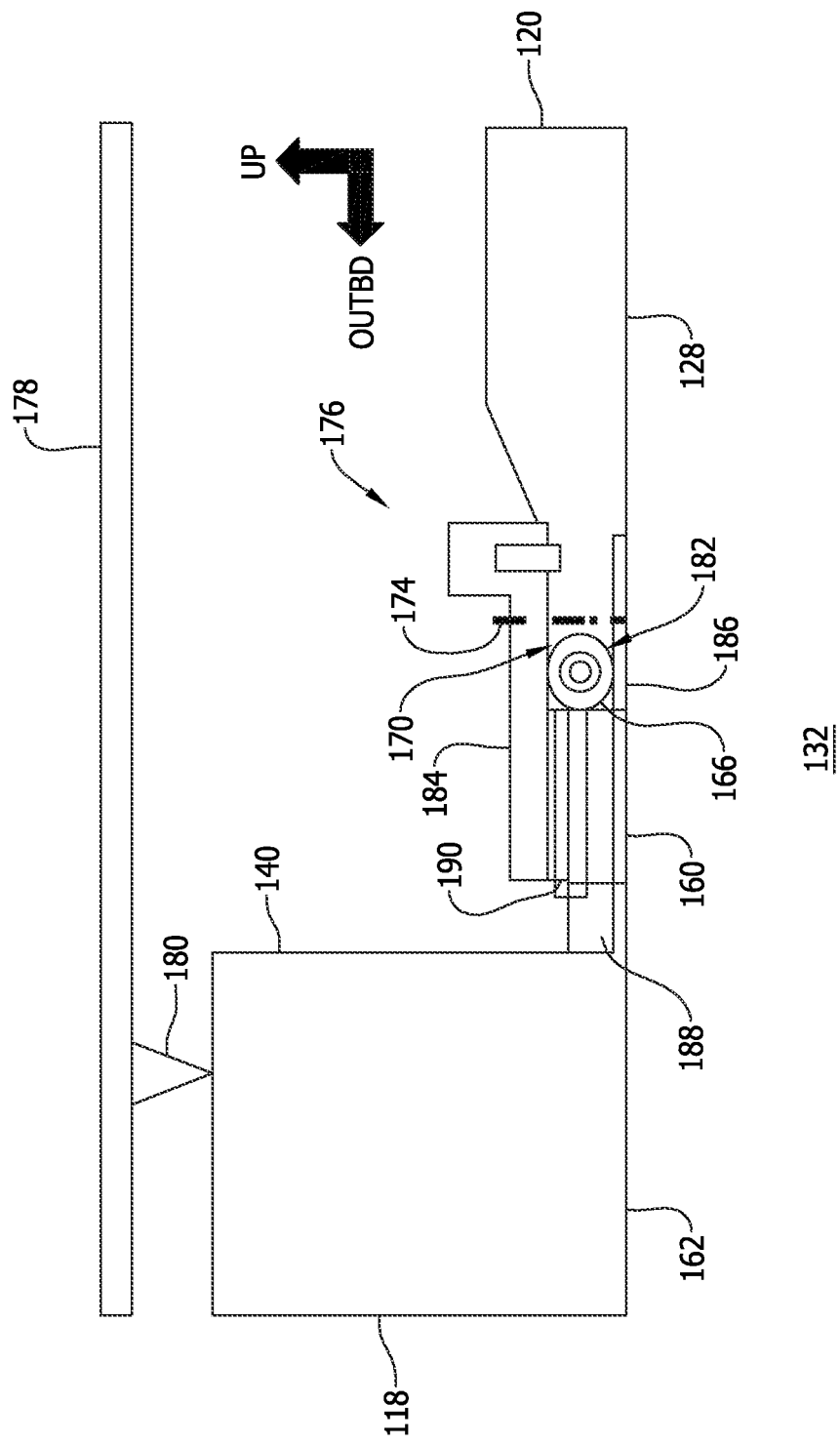
FIG. 6 illustrates the schematic sectional view shown in FIG. 5 and including an additional sealing system.

FIG. 6 illustrates the schematic sectional view shown in FIG. 5 and including an additional sealing system 176. Aircraft 100 includes a lower panel 178, and an attachment mechanism 180 coupled between air conditioning pack 118 and lower panel 178. Attachment mechanism 180 provides the primary load path for installing air conditioning pack 118 on aircraft 100, thereby reducing a load induced on exterior panel 120 by air conditioning pack 118 when attachment is made therebetween. As such, air conditioning pack 118 is held substantially stationary relative to lower panel 178.

Air conditioning pack 118 is spaced from exterior panel 120 such that a gap 182 is defined between flange 160 of air conditioning pack 118 and side edge 170 of exterior panel 120. First seal member 166 is positioned within gap 182, and a second seal member 184 and a third seal member 186 are positioned on opposing sides of gap 182. Second seal member 184 is adapted to seal gap 182 and to also accommodate movement of exterior panel 120 relative to air conditioning pack 118. For example, a layer 188 of a low friction coating material is applied to flange 160, and second seal member 184 has a sacrificial layer 190 of material formed thereon. In operation, exterior panel 120 is translatable relative to air conditioning pack 118 as a result of the sliding interface between layer 188 of low friction coating material and sacrificial layer 190. As such, sealing system 176 is capable of accommodating a greater degree of relative motion between air conditioning pack 118 and exterior panel 120.

Figure 7:
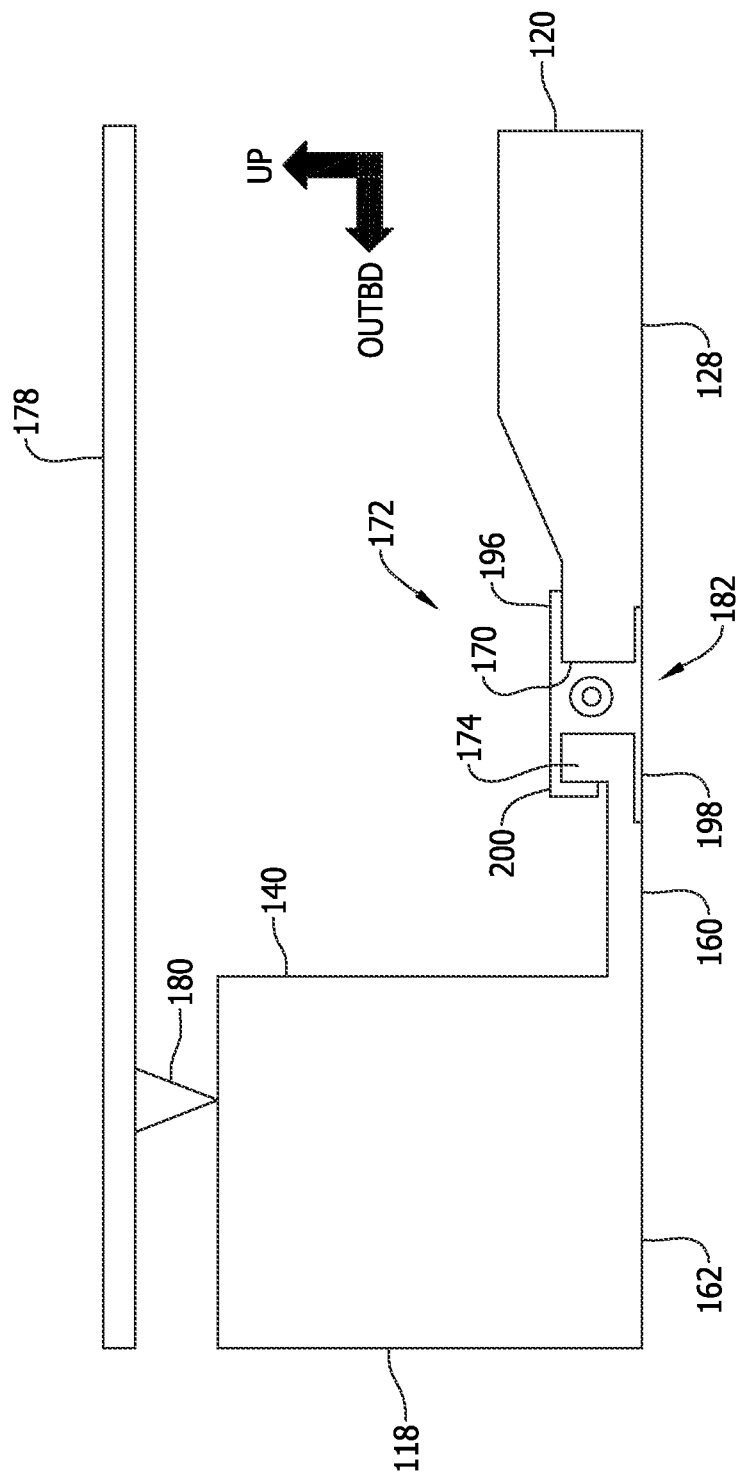
FIG. 7 illustrates the schematic sectional view shown in FIG. 5 and including an additional sealing system.

FIG. 7 illustrates the schematic sectional view shown in FIG. 5 and including an additional sealing system 192 in which exterior panel 120 provides a primary load path for the installation of air conditioning pack 118. Air conditioning pack 118 is spaced from exterior panel 120 such that a gap 182 is defined between flange 160 of air conditioning pack 118 and side edge 170 of exterior panel 120. In addition, flange 160 includes a lip member 194 oriented to extend into interior 116 of pack bay 112. Sealing system 192 includes a seal member 196 positioned within gap 182, and having a first portion 198 and a second portion 200 positioned on opposing sides of gap 182. Second portion 200 of seal member 196 is coupled to, and encloses at least a portion of lip member 194. As such, lip member 194 facilitates retaining seal member 196 in place relative to air conditioning pack 118 and exterior panel 120.

Figure 8:
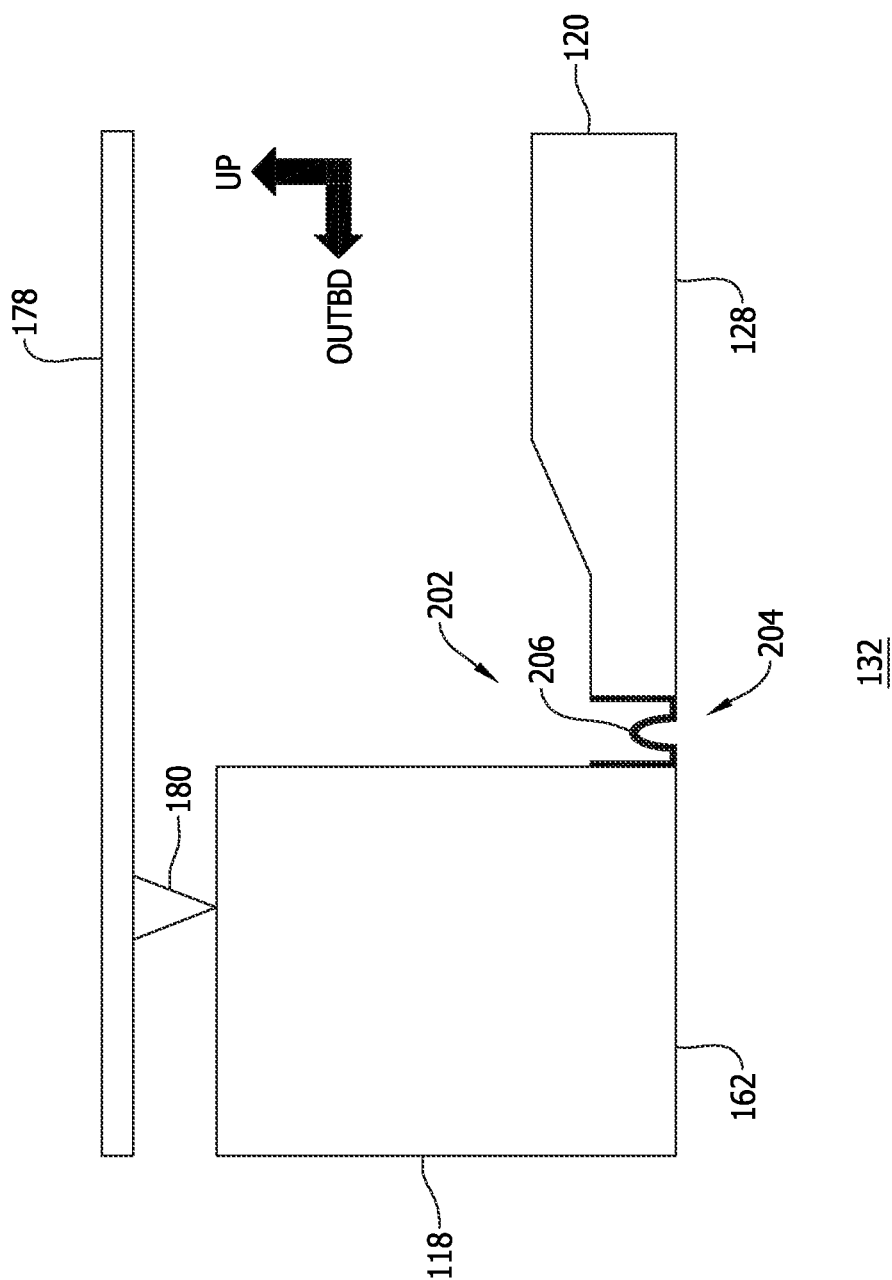
FIG. 8 illustrates the schematic sectional view shown in FIG. 5 and including an additional sealing system in a first operational mode.
Figure 9:
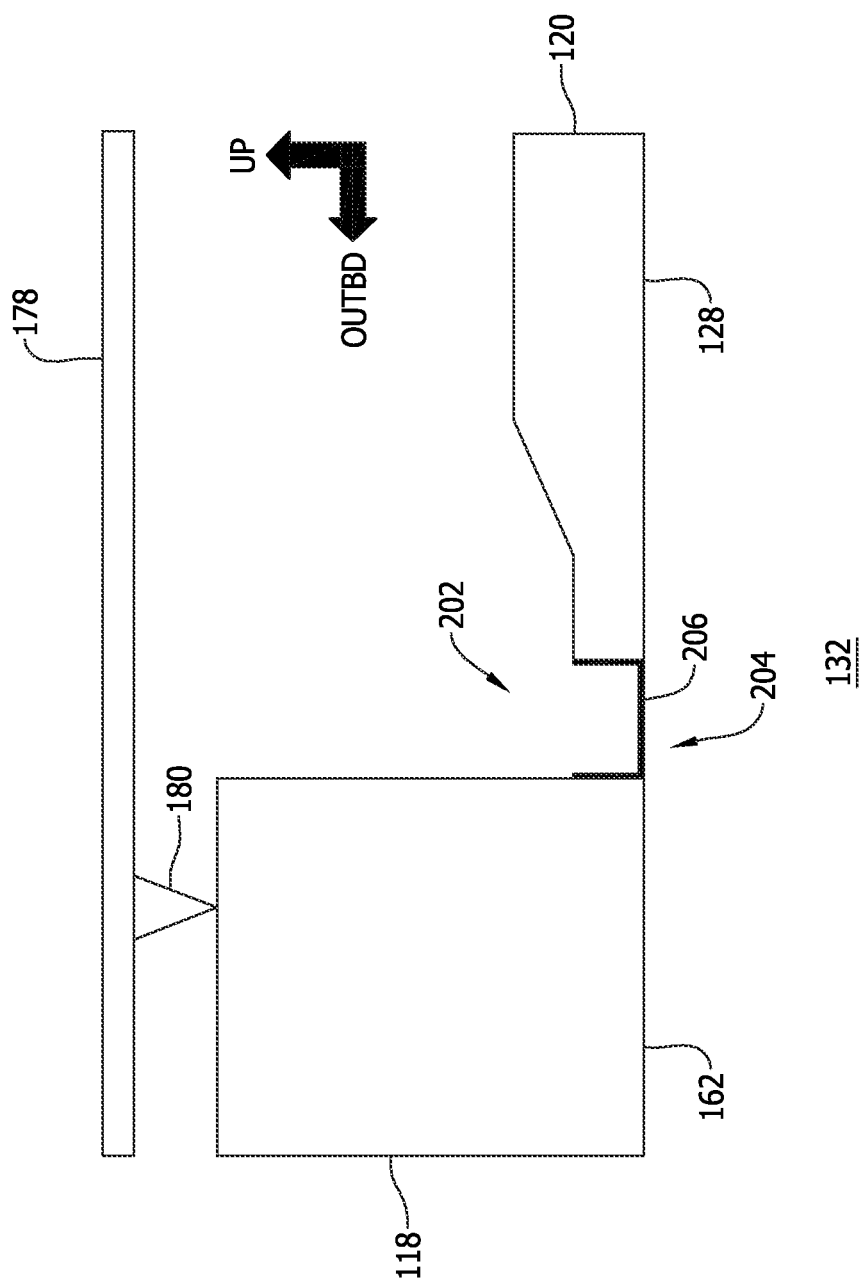
FIG. 9 illustrates the schematic sectional view shown in FIG. 5 and including an additional sealing system in a second operational mode.

FIG. 8 illustrates the schematic sectional view shown in FIG. 5 and including an additional sealing system 202 in a first operational mode, and FIG. 9 illustrates additional sealing system 202 in a second operational mode. Air conditioning pack 118 and exterior panel 120 are spaced from each other such that a gap 204 is defined therebetween. Sealing system 202 includes a spring-seal member 206 positioned within gap 204. Spring-seal member 206 is pre-loaded within gap 204 when in the first operational mode to enable spring-seal member 206 to accommodate relative movement between air conditioning pack 118 and exterior panel 120. For example, as shown in FIG. 9, spring-seal member 206 is expandable to accommodate an increase in the size of gap 204 as exterior panel 120 moves away from air conditioning pack 118. Spring-seal member 206 may be fabricated from any material that enables sealing system 202 to function as described herein. An example material includes, but is not limited to, a shape memory alloy material. In an alternative implementation, spring-seal member 206 is biasing device at least partially encapsulated by elastomeric material.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft air conditioning pack assembly comprising:
an air conditioning pack configured to discharge heat; and
an exterior panel positioned in close proximity to the air conditioning pack, the exterior panel comprising an opening defined therein, and the exterior panel comprising a first side facing towards the air conditioning pack, and a second side defining an exterior surface of the aircraft configured to be in communication with a free stream airflow,
wherein the air conditioning pack comprises a bottom wall that is disposed within and extends through the opening such that the bottom wall protrudes beyond the exterior surface of the aircraft as defined by the exterior panel, the bottom wall including a curved section oriented obliquely relative to the free stream airflow to facilitate transferring heat from the air conditioning pack to the free stream airflow, and wherein the portion of the bottom wall extending through the opening has an airfoil cross-sectional shape.

2. The assembly in accordance with claim 1, wherein the air conditioning pack comprises a heat exchanger comprising a top side and a plurality of lateral sides, the assembly further comprising a layer of thermally insulative material extending across the top side and the plurality of lateral sides.

3. The assembly in accordance with claim 2, wherein the layer of thermally insulative material does not extend between the air conditioning pack and the exterior panel.

4. The assembly in accordance with claim 1 further comprising a seal member positioned between the portion of the air conditioning pack that is disposed within the opening and a perimeter of the opening in the exterior panel, wherein the first side of the exterior panel defines an interior side of the exterior panel and the seal member is configured to restrict inflow of the free stream airflow through the opening and towards the interior side of the exterior panel that the air conditioning pack is proximate to.

5. The assembly in accordance with claim 4, wherein the seal member is fabricated from a material configured to accommodate relative movement between the air conditioning pack and the exterior panel.

6. An aircraft comprising:
a pack bay defined on an underside of the aircraft, the pack bay comprising an interior;
an air conditioning pack positioned within the interior, the air conditioning pack configured to discharge heat; and
an exterior panel positioned in close proximity to the air conditioning pack and at least partially defining the interior, the exterior panel comprising an opening defined therein, and the exterior panel comprising a first side facing towards the air conditioning pack, and a second side defining an exterior surface of the aircraft configured to be in communication with a free stream airflow,
wherein the air conditioning pack comprises a bottom wall that is disposed within and extends through the opening such that the bottom wall protrudes beyond the exterior surface of the aircraft as defined by the exterior panel, the bottom wall including a continuous curved section oriented obliquely relative to the free stream airflow to facilitate transferring heat from the air conditioning pack to the free stream airflow.

7. The aircraft in accordance with claim 6, wherein the exterior panel is a pack bay door or a fairing panel of the aircraft.

8. The aircraft in accordance with claim 6, wherein the air conditioning pack comprises a heat exchanger comprising a top side and a plurality of lateral sides, the aircraft further comprising a layer of thermally insulative material extending across the top side and the plurality of lateral sides.

9. The aircraft in accordance with claim 8, wherein the layer of thermally insulative material does not extend between the air conditioning pack and the exterior panel.

10. The aircraft in accordance with claim 6, wherein the portion of the bottom wall extending through the opening has an airfoil cross-sectional shape.

11. The aircraft in accordance with claim 6 further comprising a seal member positioned between the portion of the air conditioning pack that is disposed within the opening and a perimeter of the opening in the exterior panel, wherein the first side of the exterior panel defines an interior side of the exterior panel and the seal member is configured to restrict inflow of the free stream airflow through the opening and towards the interior side of the exterior panel that the air conditioning pack is proximate to.

12. A method of assembling an aircraft, the method comprising:
defining a pack bay on an underside of the aircraft, wherein the pack bay includes an interior;
positioning an air conditioning pack within the interior, wherein the air conditioning pack is configured to discharge heat;
positioning an exterior panel in close proximity to the air conditioning pack to at least partially define the interior, wherein the exterior panel includes an opening defined therein, and wherein the exterior panel is positioned such that a first side thereof faces towards the air conditioning pack, and such that a second side thereof defines an exterior surface of the aircraft configured to be in communication with a free stream airflow; and
disposing a bottom wall of the air conditioning pack within the opening, the bottom wall extending through the opening such that the bottom wall protrudes beyond the exterior surface of the aircraft as defined by the exterior panel, the bottom wall including a continuous curved section oriented obliquely relative to the free stream airflow to facilitate transferring heat from the air conditioning pack to the free stream airflow.

13. The method in accordance with claim 12 further comprising extending a layer of thermally insulative material across the air conditioning pack, wherein the layer of thermally insulative material does not extend between the air conditioning pack and the exterior panel.

14. The method in accordance with claim 12 further comprising disposing a seal member between the air conditioning pack and the exterior panel, the seal member configured to conform to the portion of the air conditioning pack disposed within the opening.

* * * * *